(12) United States Patent
Wells et al.

(10) Patent No.: US 7,052,234 B2
(45) Date of Patent: May 30, 2006

(54) TURBINE VANE COLLAR SEAL

(75) Inventors: Thomas Allen Wells, West Chester, OH (US); Mark Eugene Noe, Morrow, OH (US); David Edward Bulman, Cincinnati, OH (US); Nitin Bhate, Rexford, NY (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 10/874,518

(22) Filed: Jun. 23, 2004

(65) Prior Publication Data

US 2005/0287002 A1    Dec. 29, 2005

(51) Int. Cl.
*F03D 11/00* (2006.01)

(52) U.S. Cl. .................. 415/137; 415/191; 415/209.4; 415/210.1

(58) Field of Classification Search ................ 415/134, 415/135, 136, 137, 138, 173.7, 174.2, 191, 415/209.4, 209.3, 210.1
See application file for complete search history.

(56) References Cited

U.S. PATENT DOCUMENTS

| | | |
|---|---|---|
| 2,914,300 A | 11/1959 | Sayre |
| 5,509,669 A | 4/1996 | Wolfe et al. |
| 5,630,700 A | 5/1997 | Olsen et al. |
| 5,657,998 A | 8/1997 | Dinc et al. |
| 5,915,697 A | 6/1999 | Bagepalli et al. |
| 6,200,092 B1 | 3/2001 | Koschier |
| 6,464,456 B1 * | 10/2002 | Darolia et al. ............... 415/134 |
| 6,599,089 B1 | 7/2003 | Aksit et al. |
| 6,609,885 B1 | 8/2003 | Mohammed-Fakir et al. |
| 6,609,886 B1 | 8/2003 | Aksit et al. |
| 6,637,751 B1 | 10/2003 | Aksit et al. |
| 6,637,752 B1 | 10/2003 | Aksit et al. |
| 6,652,231 B1 | 11/2003 | Vedantam et al. |
| 6,655,913 B1 | 12/2003 | Vedantam et al. |
| 6,719,295 B1 | 4/2004 | Mohammed-Fakir et al. |
| 2002/0127097 A1 | 9/2002 | Darolia et al. |
| 2003/0122310 A1 | 7/2003 | Mohammed-Fakir et al. |

* cited by examiner

*Primary Examiner*—Edward K. Look
*Assistant Examiner*—Dwayne J White
(74) *Attorney, Agent, or Firm*—V. G. Ramaswamy; Francis L. Conte

(57) ABSTRACT

A collar seal is configured for a turbine nozzle vane. The seal includes a retainer having a circumferential airfoil contour conforming with the airfoil contour of the vane. A flexible leaf is surrounded by the retainer and fixedly joined thereto. A woven sheath encases the leaf and is fixedly joined to the retainer. In an exemplary embodiment, the collar seal surrounds one end of a ceramic turbine vane mounted in a metal supporting band.

31 Claims, 6 Drawing Sheets

TURBINE VANE COLLAR SEAL

BACKGROUND OF THE INVENTION

The present invention relates generally to gas turbine engines, and, more specifically, to turbine nozzles therein.

In a gas turbine engine air is pressurized in a compressor and mixed with fuel in a combustor for generating hot combustion gases. A high pressure turbine (HPT) extracts energy from the hot gases to power the compressor. And, a low pressure turbine (LPT) extracts additional energy from the gases to power an upstream fan in an aircraft turbofan engine application, or to provide external power through a drive shaft for marine and industrial applications.

The HPT includes a first stage turbine nozzle disposed at the outlet of the combustor that first receives therefrom the hot combustion gases which are then directed by the nozzle vanes into a row of first stage turbine rotor blades extending outwardly from the perimeter of a rotor disk. The blades extract energy from the gases to rotate the disk, which in turn rotates the rotor blades of the compressor.

In order to withstand the hot combustion gases, the various components of the HPT are typically formed of superalloys which maintain their strength at elevated temperatures. Furthermore, the nozzle vanes and rotor blades are typically hollow and provided with cooling circuits therein through which is circulated a portion of the air pressurized by the compressor for cooling the vanes and blades during operation.

The prior art includes a myriad of cooling circuits and features specifically configured for the stator vanes of the nozzle and the rotor blades disposed downstream therefrom.

However, any air bled from the compressor for cooling the turbine components is not used during the combustion process and correspondingly reduces the efficiency of the engine. Engine efficiency is directly related to the temperature of the combustion gases generated during operation, with higher combustion gases being used for increasing efficiency of the engine.

Modern gas turbine engines exploit the strength of the superalloy metal vanes and blades and the internal cooling thereof for maximizing engine efficiency, while also obtaining a long useful life of the engine. However, further gains in engine efficiency are limited by the available superalloys and by the amount of cooling air which may be practically bled from the compressor.

Accordingly, current developments in further advancing the efficiency of gas turbine engines include the selective use of ceramic components which can withstand substantially greater temperatures of combustion gases than presently experienced by modern superalloy metals. One type of ceramic material for a gas turbine engine is ceramic matrix composite (CMC) in which silicon carbide fibers are embedded in a silicon carbide matrix for strength and durability.

However, ceramic materials lack ductility and require special mounting to prevent excessive stress therein which could lead to their brittle failure and correspondingly short useful life.

For example, ceramic materials in a gas turbine engine would necessarily be used in conjunction with conventional metal components of the same engine. The ceramic components may be preferentially utilized in the direct flowpath of the hot combustion gases and supported in metal components which do not experience the high heat loads from the combustion gases.

This presents a significant design problem since the ceramic materials have a relatively low coefficient of thermal expansion compared with metal components which expand and contract as temperatures increase and decrease during the various portions of the engine cycle.

In view of the substantial difference in coefficients of thermal expansion between the ceramic material and supporting metal components, substantial thermal stress can be generated in the ceramic material leading to the short life thereof.

Furthermore, the first stage turbine nozzle vanes are also subject to the aerodynamic or pressure loading from the hot combustion gases which must also be carried from the vanes into their supporting components.

Accordingly, it is desired to provide a turbine nozzle with ceramic vanes mounted in metal components which accommodate the different coefficients of thermal expansion therebetween.

BRIEF DESCRIPTION OF THE INVENTION

A collar seal is configured for a turbine nozzle vane. The seal includes a retainer having a circumferential airfoil contour conforming with the airfoil contour of the vane. A flexible leaf is surrounded by the retainer and fixedly joined thereto. A woven sheath encases the leaf and is fixedly joined to the retainer.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
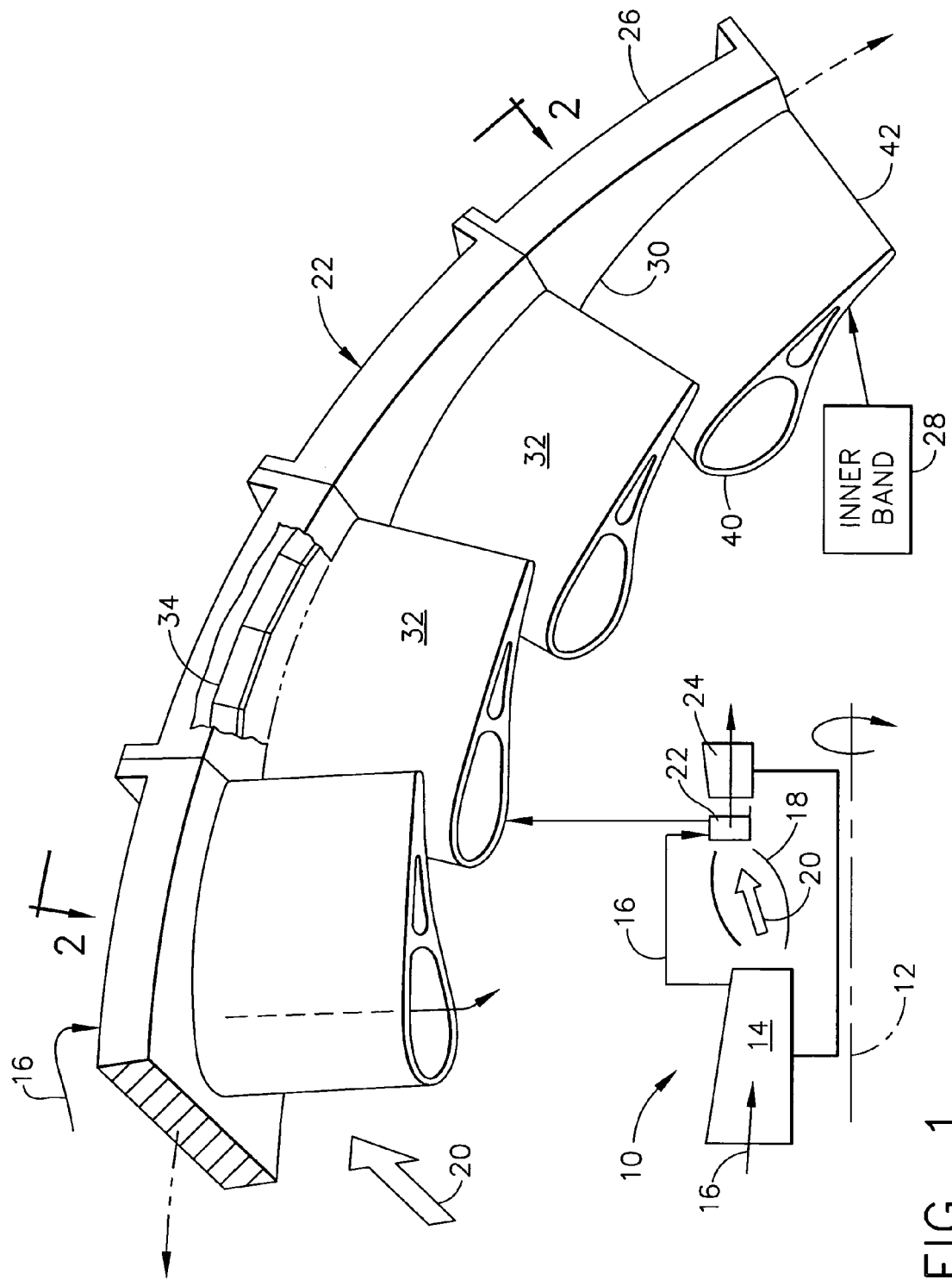
FIG. 1 is a partly sectional and schematic view of a exemplary first stage turbine nozzle in the core engine of a gas turbine engine.

Illustrated schematically in FIG. 1 is a portion of a gas turbine engine 10 which is axisymmetrical about a longitudinal or axial centerline axis 12. The engine includes a multistage axial compressor 14 configured for pressurizing ambient air 16.

An annular combustor 18 is disposed downstream from the compressor for receiving therefrom pressurized air which is mixed with fuel and ignited for generating hot combustion gases 20.

A high pressure turbine (HPT) follows the combustor and includes an annular first stage turbine nozzle 22 shown schematically in its position in the engine axisymmetrically around the centerline axis 12, as well as shown in part in isometric view. The HPT also includes a turbine rotor 24 having a row of turbine rotor blades extending radially outwardly from a supporting rotor disk, which in turn is joined by a shaft to the several stages of rotor blades of the compressor 14.

But for the turbine nozzle 22, the engine illustrated in FIG. 1 may have any conventional configuration and operation in which energy is extracted from the hot combustion gases in the turbine rotor 24 for powering the compressor 14. This core engine may be used in various applications, including, for example, turbofan aircraft engines which would also include a low pressure turbine (LPT) downstream of the core engine for extracting additional energy from the combustion gases to power an upstream turbine fan (not shown). In marine and industrial applications, the LPT may be used to drive an external shaft for powering the drive system of a ship or an electrical generator, for example.

The turbine nozzle 22 illustrated in FIG. 1 includes radially outer and inner bands 26,28 each having a plurality of circumferentially spaced apart apertures 30 extending radially therethrough. The two bands have similar configurations for supporting the opposite radial ends of a corresponding row of hollow nozzle vanes 32.

Each of the vanes 32 is a discrete component and is preferably ceramic as compared to the supporting bands 26,28 which are preferably metal. The ceramic vanes may be formed of the typical CMC material described above, whereas the bands may be formed of typical superalloys, such as cobalt-based metal alloys.

By utilizing ceramic vanes 32 in the first stage turbine nozzle 22, the temperature of the combustion gases 20 may be further increased in the engine for further increasing the overall efficiency of the engine. The ceramic vanes 32 have sufficient strength at such elevated temperatures for ensuring a suitable useful life during operation.

The vanes are preferably hollow with two simple radial flow channels extending between the opposite ends thereof through which a portion of pressurized compressor air 16 may be channeled during operation for internal cooling thereof. The compressor bleed air 16 may also be used for cooling the outer and inner bands 26,28 in any convenient manner.

As indicated above, the coefficient of thermal expansion for the ceramic vanes 32 is significantly lower than the coefficient of thermal expansion for the metal bands 26,28. Accordingly, in order to effectively mount the vanes 32 in the supporting bands 26,28, the mounting apertures 30 have airfoil configurations matching those of the opposite ends of the vanes 32, and the ends of the vanes are mounted in those apertures using corresponding collar seals 34 which mount the vanes to the bands, as well as seal the vanes to the bands.

More specifically, the plurality of nozzle vanes 32 are initially formed as individual or discrete ceramic vanes. The outer and inner bands are configured as full annular rings when mounted in the engine, and are preferably formed in individual segments, such as one segment corresponding with each of the vanes. The band segments may be fixedly joined together using suitable mounting flanges and bolt fasteners extending therethrough in the exemplary manner illustrated in FIGS. 1 and 2.

Figure 3:
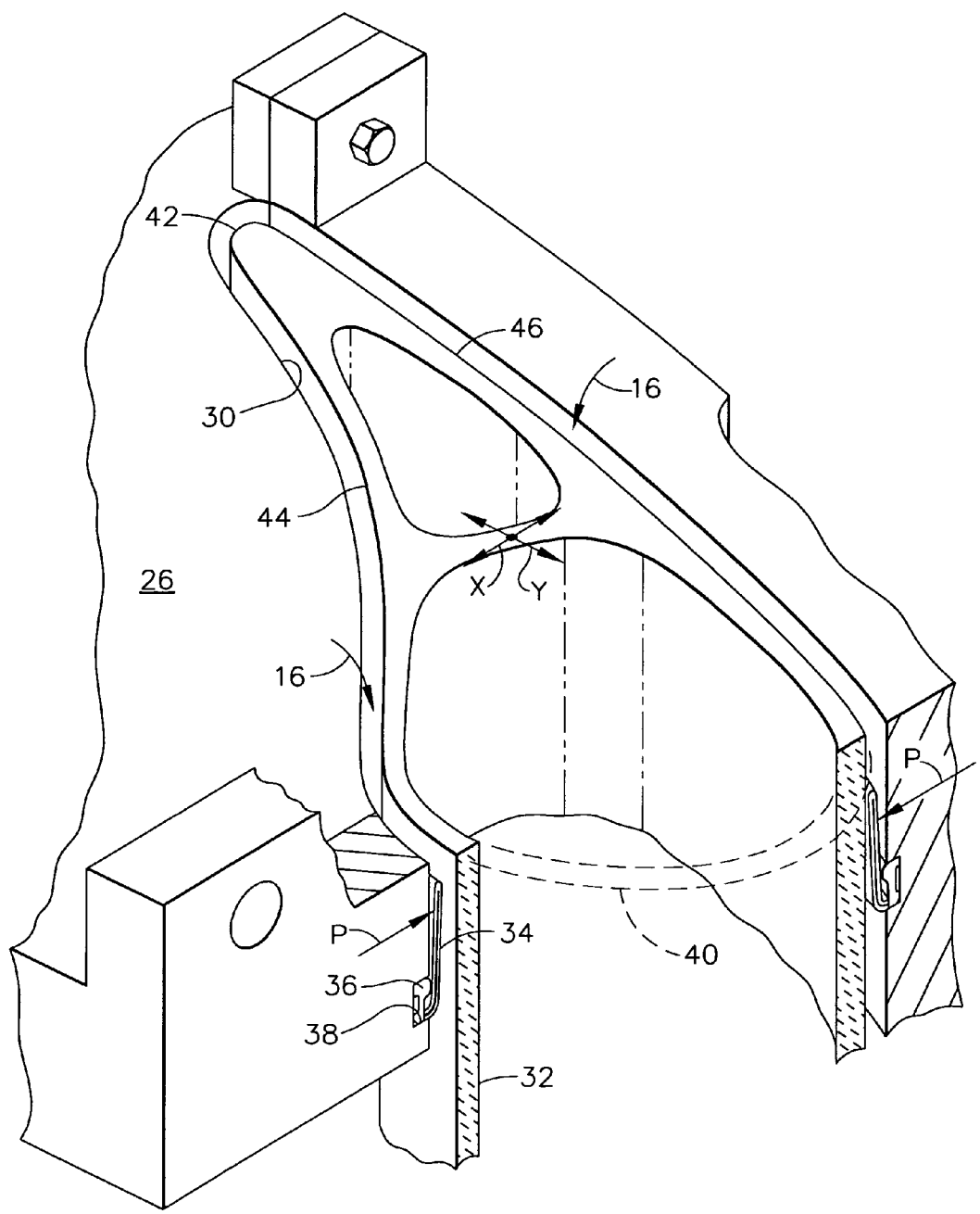
FIG. 3 is a partly sectional isometric view of an exemplary one of the ceramic vanes illustrated in FIGS. 1 and 2 mounted in an outer metal band using a surrounding collar seal.

As initially illustrated in FIG. 3, each of the collar seals 34 is fixedly joined at a proximal end to each of the bands in respective ones of the apertures 30. The opposite tip or distal ends of the seals surround corresponding vane ends in both sealing engagement therewith, as well as a structural mount therefor. In this way, the individual vanes are not fixedly or integrally joined to the outer and inner bands in the conventional manner of all-metal turbine nozzles, but instead, the individual vanes are loosely trapped in the two collar seals at the opposite radial ends thereof in the mounting apertures 30.

Figure 2:
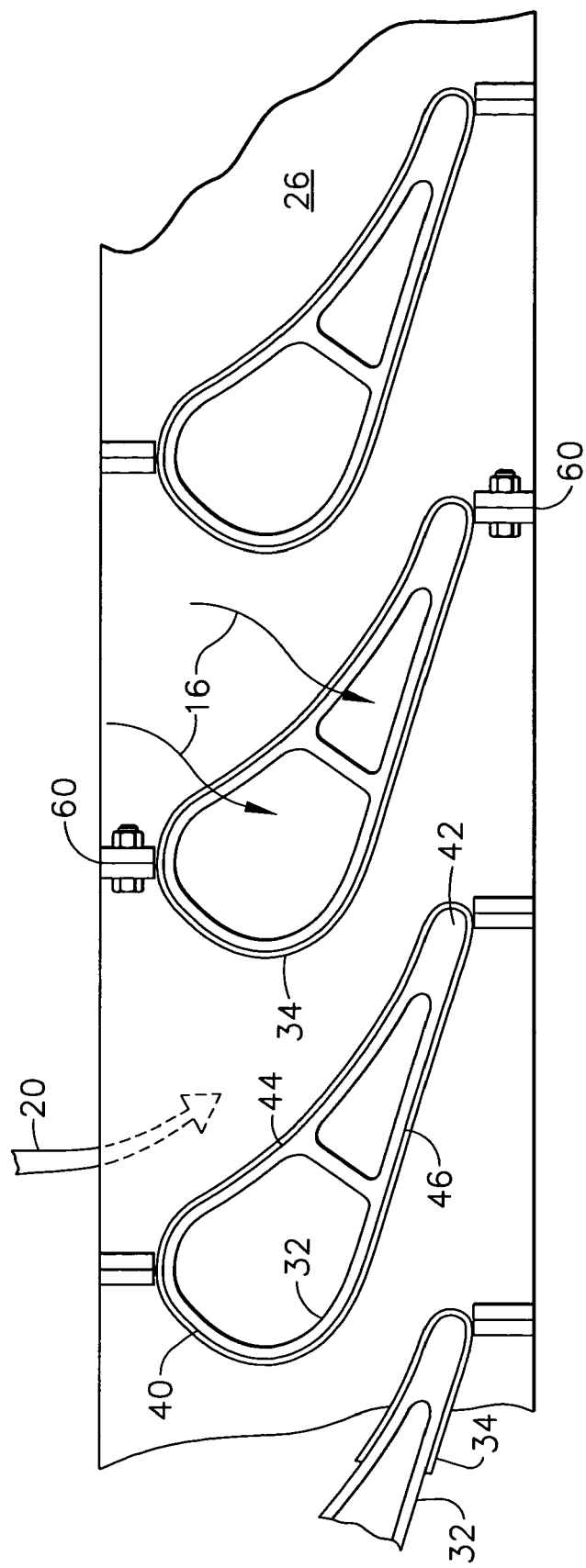
FIG. 2 is a planiform view of a portion of the turbine nozzle illustrated in FIG. 1 and taken along line 2—2.

As shown in FIGS. 1 and 2, the individual vanes are fully trapped around the circumference of the opposite radial ends thereof in the corresponding bands. The individual vanes may also be radially trapped in the bands using stop members located outboard of the outer band and inboard of the inner band, such as integral small tabs or flanges (not shown) which overlap in part the apertures 30 over the corresponding ends of the vanes.

Figure 4:
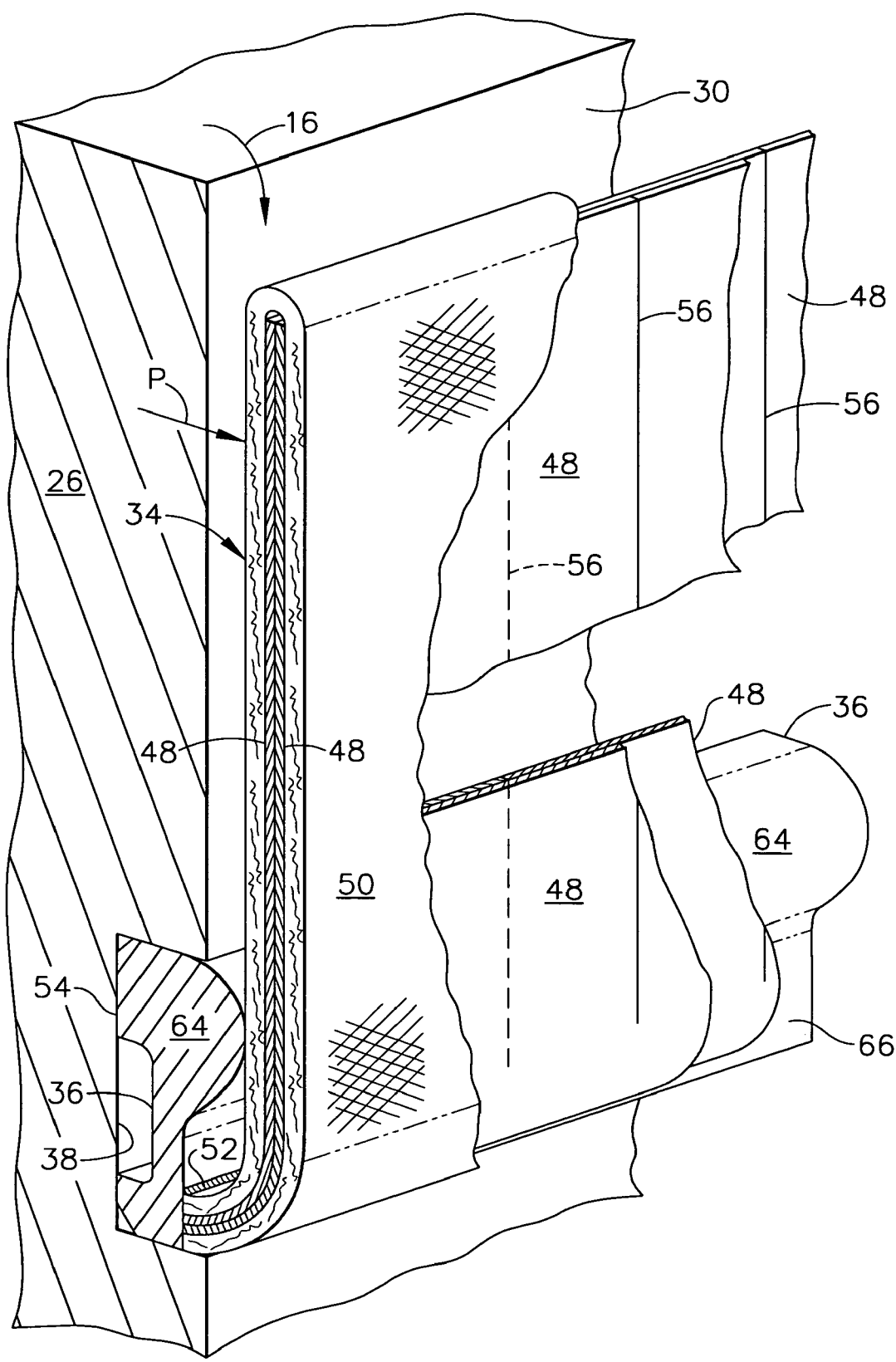
FIG. 4 is an enlarged, partly sectional isometric view of a portion of the collar seal illustrated in FIG. 3 mounted in a corresponding slot in the metal band.

A portion of an exemplary configuration of the collar seal 34 is illustrated in more detail in FIG. 4. Each collar seal includes an annular backing bar or retainer 36 having a circumferential airfoil contour which conforms with the airfoil contour of the mounted end of the vane 32 as illustrated in FIGS. 2 and 3.

The retainer 36 illustrated in FIGS. 3 and 4 is mounted in a corresponding recess or slot 38 formed around the inner surface of each of the apertures 30. As shown in FIG. 3 each vane 32 has a leading edge 40 which first receives the combustion gases from the combustor, and an axially opposite trailing edge 42.

The vane has an aerodynamic or airfoil profile in radial section which decreases in thickness from the wide leading edge portion of the vane to the thin trailing edge portion of the vane along circumferentially opposite pressure and suction sides 44,46. The pressure side 44 of the vane is generally concave, with the opposite suction side 46 being generally convex in the typical profile of turbine nozzle vanes.

Accordingly, the retainer 36 of the collar seal has a matching or conforming airfoil contour to closely surround the perimeter of the mounting ends of the vanes. Each seal additionally includes a thin, flexible shim or leaf 48 as shown in FIG. 4 which is surrounded by the retainer 36 and fixedly joined thereto. Correspondingly, a woven cloth or fabric sheath 50 covers or encases the leaf 48 and is also fixedly joined to the common retainer 36.

The various components of the collar seal 34 are preferably made of metal such as the various superalloy metals commonly found in turbine designs. For example, the annular retainer 36 may be formed of Inconel 625, the flexible leaf 48 may also be formed of Inconel 625, and the woven sheath 50 may be formed of Haynes 188, which is a cobalt-based superalloy.

The thin leaf 48 and woven sheath 50 are commonly joined to the supporting retainer and are relatively flexible whereas the retainer is rigid. The sheath and leaf provide a resilient support for the corresponding end of the ceramic vane, and a suitable line of contact seal therewith.

The woven sheath provides wear resistance and heat protection from the heat loads emitted from the hot combustion gases which flow over the exposed surfaces of the ceramic vanes during operation when mounted between the opposite outer and inner bands in which the collar seals are mounted and protected.

Figure 5:
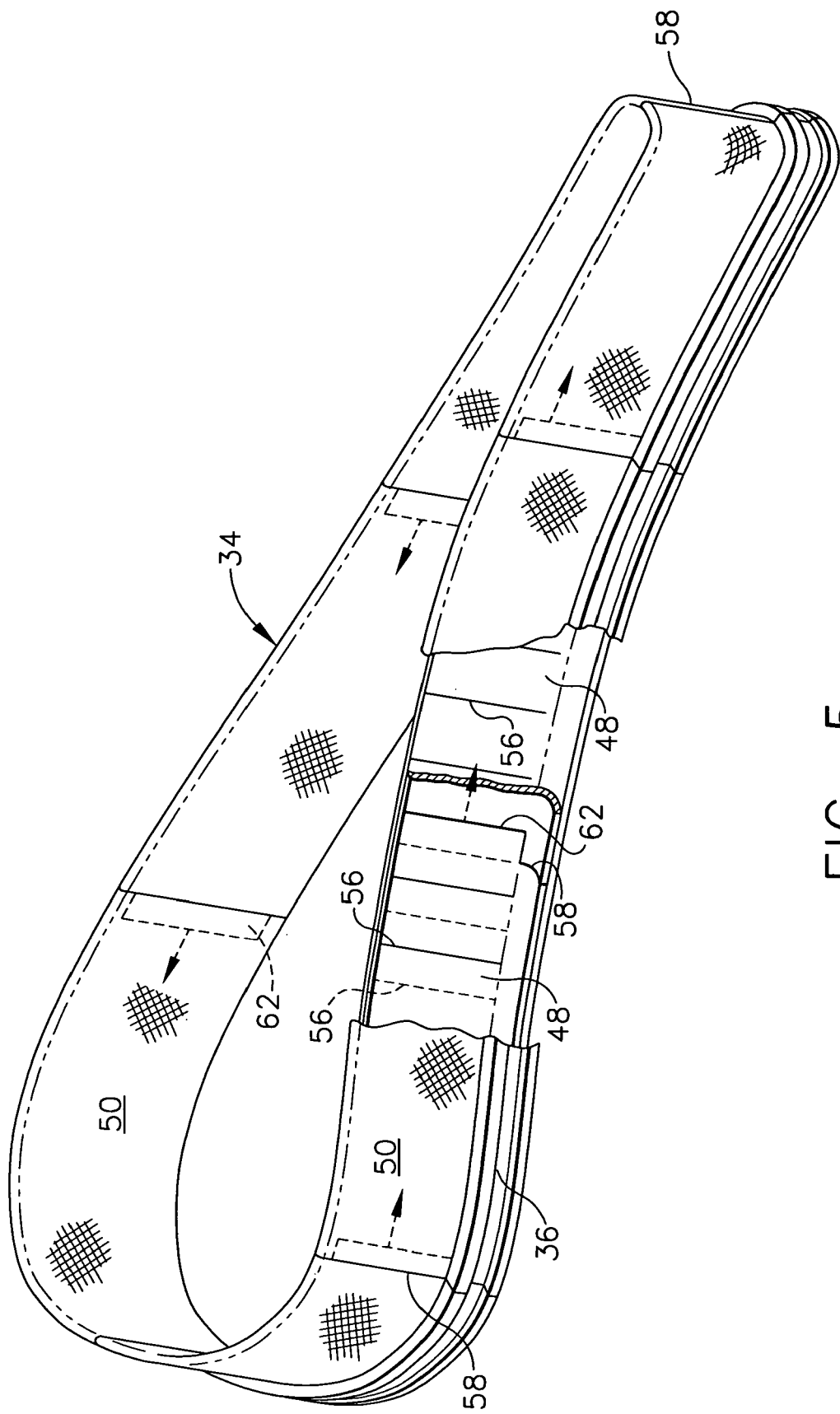
FIG. 5 is a partly sectional isometric view of the collar seal illustrated in FIGS. 2 and 3 in isolation from the corresponding end of the ceramic vanes mounted in the metal bands.

The collar seal 34 is illustrated installed in the aperture 30 of the outer band 26 in FIG. 4, and in isolation in FIG. 5. The embedded leaf 48 is preferably laminated in multiple layers or plies, such as two-plies which extend around or along the airfoil contour of the rigid retainer 36 which provides corresponding shape definition to the flexible leaf and sheath. The exemplary two-plies of the leaf 48 have generally flat surfaces which laterally abut each other radially or vertically outwardly from the common retainer 36.

The woven sheath 50 is preferably a single ply metallic cloth having metal fibers or strands woven in any suitable manner such as with diagonal orientation relative to the common retainer 36. The woven sheath 50 wraps around the common distal ends of the two-ply leaf 48 and conforms with the flat configuration of the leaf around the entire airfoil contour of the retainer 36.

As best shown in FIG. 4, the proximal ends of the two leaf plies 48 and the encasing sheath 50 are commonly joined to the retainer 36 by welding for example which results in a weld bead 52 extending along the circumference of the retainer 36. The rigid retainer 36 is in turn suitably fixedly joined to the supporting band by brazing for example which results in a continuous braze joint 54 along the circumference of the retainer.

In this way, the individual collar seals 34 are fixedly joined by their rigid retainers 36 in the corresponding slots 38 around the perimeter of the mounting apertures 30. The proximal ends of the leaf 48 and sheath 50 are rigidly joined to the retainer, and the opposite distal or tip ends thereof extend vertically or radially inside the apertures 30 for providing flexible support and sealing with the corresponding ends of the ceramic vanes around the full circumference thereof.

FIG. 2 illustrates the full circumference mounting of the opposite ends of the ceramic vanes 32 using the surrounding collar seals 34 mounted in the bands. During operation, the hot combustion gases 20 flow axially through the converging nozzle passages defined circumferentially between the adjacent vanes for being properly directed to the downstream rotor blades (not shown). The individual vanes are therefore subject to both the elevated temperature and pressure of the hot combustion gases during operation.

As indicated above, the temperature of the combustion gases causes the ceramic vanes and the metal bands to expand and contract at different rates corresponding with their different coefficients of thermal expansion. Furthermore, the substantial pressure drop of the combustion gases across the nozzle vanes creates aerodynamic loads thereon which must be carried through the collar seals 34 into the outer and inner bands.

Since the individual vanes are loosely and not integrally mounted into the respective bands, they are subject to various rocking, rolling, and slipping movement within the small surrounding clearance provided between the vanes and mounting apertures 30. Furthermore, manufacturing tolerances for the vanes themselves, the mounting apertures 30, and the collar seals 34 correspondingly affect the specific location of the vane ends in the corresponding surrounding mounting apertures.

Accordingly, the airfoil configuration of the collar seal 34 and flexibility of the leaf 48 and sheath 50 thereof may be used to advantage to accommodate the various local movement of the vane ends in the mounting apertures 30, see movement axes X,Y in FIG. 3, which vary during operation along both the pressure and suction sides of the collar seal itself as well as between the corresponding leading and trailing edges thereof.

As shown in FIGS. 4 and 5, the leaf plies 48 are preferably slit along their local axial axis which corresponds with the radial axis of the vanes mounted in the engine. Each ply includes a plurality of transverse slits 56 which extend from the proximal ends thereof at the retainer 36 to their distal ends for increasing flexibility thereof. In this way, the leaf plies may be formed of individual cantilevered fingers which better conform with the airfoil configuration of the supported vane around the full circumference thereof including the opposite leading and trailing edges and pressure and suction sides.

In the preferred embodiment, the slits 56 in each of the two plies of the leaf 48 are preferably longitudinally or circumferentially offset around the perimeter of the collar seal between the two plies thereof to improve sealing by reducing any leakage introduced by the slits themselves.

FIGS. 3 and 4 illustrate the collar seal 34 mounted in the corresponding supporting band. During operation, the pressurized air 16 is suitably channeled from the compressor through the outboard end of the apertures 30 in the outer band, and correspondingly through the inboard end of the apertures in the inner band with the corresponding collar seals being mounted upside down compared to the configuration illustrated in FIG. 4.

The pressurized air 16 acts over the entire outer surface area of the individual collar seals as shown in FIGS. 3 and 4 to exert an inwardly directed pressure force P on the sheath and leaf thereof which drives the collar seal in further sealing engagement with the respective vanes being mounted therein. The leaf and sheath of each seal may therefore deflect as required from the supporting retainer 36 to maintain line of contact sealing with the vane, notwithstanding relative X,Y movement of the vane in the corresponding mounting apertures 30.

In the preferred embodiment illustrated in FIG. 5, the retainer 36, leaf plies 48, and sheath 50 are segmented around the circumference of the individual collar seal for advantages in manufacture and for better conforming with the three dimensional configuration and orientation of the collar seal when mounted in the annular bands shown in FIG. 1.

For example, the collar seal illustrated in FIG. 5 includes three segments along the pressure side of the seal as delineated by the corresponding splitlines 58. And, each collar seal preferably also includes four segments along the suction side thereof which also wraps around the leading edge to the beginning of the pressure side.

The seven segments illustrated in FIG. 5 may be separately manufactured for better conforming with the substantial change in contour of the vane between its leading and trailing edges. The seven segments may then be suitably assembled together to conform not only with the perimeter airfoil contour of the individual vane itself, but also the cylindrical contour of the outer and inner bands in which they are mounted, as shown in FIG. 1.

The retainer 36 illustrated in FIGS. 4 and 5 is preferably a rigid rod or bar which conforms with the airfoil contour of the vane ends, and may be suitably machined in conventional multiaxis numerically controlled machines. The leaf plies 48 are preferably thin, flexible sheet metal which may be conventionally formed to shape to additionally include the slits 56 extending in most part therethrough.

The initially flat sheet metal segments of the collar seal are welded along with the encasing sheath 50 to the rigid retainer 36 which then conforms the sheet metal leaf plies and woven sheath to the desired airfoil contour.

The different segments of the collar seal 34 illustrated in FIG. 5 may be specifically configured for locally matching the corresponding portion of the supported vane from its leading edge having a relatively large width with large diameter curvature to the relatively thin trailing edge having a small diameter curvature or radius at the trailing edge thereof. The pressure side of the collar seal is generally concave with the three segments conforming thereto. And, the suction side of the collar seal is generally convex with the three major segments conforming thereto, and the fourth segment being outwardly convex as it wraps around the leading edge portion of the collar seal.

A particular advantage of this configuration is the assembly of the multi-segment collar seal in the corresponding bands, such as the outer band illustrated in FIG. 2. The outer band, and similarly the inner band, include axial splitlines 60 which separate the band at the leading and trailing edges of each vane and mounting aperture 30 extending therebetween. Each band segment therefore includes the pressure-side portion of one mounting aperture and the suction-side portion of an adjacent mounting aperture.

Three segments of one collar seal may be conveniently mounted in the supporting slot in the one-half aperture and four segments of the next collar seal may be conveniently mounted in the next half-aperture of the band segment. The entire assembly may then be placed in a vacuum oven for conventional brazing of the seal segments therein.

The so brazed band segments may then be subsequently joined together to complete the annular continuity of the bands and trapping therebetween the corresponding ceramic vanes.

In the preferred embodiment illustrated in FIGS. 2 and 5, the axial splitlines 60 of the outer band 26 conform with the first segment splitline 58 on the pressure side of the collar seal near the leading edge thereof, and with the last splitline 58 joining the pressure and suction sides of the collar seal at the trailing edge.

In the preferred embodiment illustrated in FIG. 5, the segmented retainer 36 includes seven segments having end portions or sections abutting each other around the circumference thereof. Similarly, the woven sheath 50 includes seven segments having end portions or sections abutting each other around the circumference thereof. And, the two leaf plies 48 each includes seven segments having end portions or sections abutting each other around the circumference of the seal.

In this construction of the collar seals, the seven segments may be separately manufactured to locally conform with the corresponding portions of the vanes being supported, and simply abutted together in the mounting slot 38 of the bands as illustrated in FIGS. 3 and 4. Preferably, the segmented leaf plies 48 overlap each other around the circumference of the collar seal to provide internal seal joints.

This is illustrated in FIG. 5 in which one of the leaf plies 48 has a tongue or tab 62 which extends outwardly from the corresponding segments of the other leaf ply, sheath 50, and retainer 36 for mating with a groove in the next adjacent seal segment in which the corresponding leaf ply is offset inside the segment. The tab 62 illustrated in FIG. 5 is provided over the full straight portion of the leaf ply, and terminates near the proximal end thereof which is bent as illustrated in FIG. 4 for attachment to the retainer 36.

The tongue-and-groove joints of the overlapping leaf plies may be provided at any one or more of the seven collar seal segments illustrated in FIG. 5. These joints improve the local sealing of the segments and structurally interconnect the leaf plies and woven sheath. The protruding tabs 62 may be eliminated, if desired, at the two splitlines 58 of the collar seal corresponding with the axial splitline 60 of the bands as illustrated in FIG. 2.

The retainer 36 illustrated in FIG. 4 preferably includes an outboard surface having a slot in which braze material may be conveniently trapped for furnace brazing the collar seal segments into the band segments during manufacture. The inboard surface of the retainer 36 preferably includes an arcuate or semicircular fulcrum bead 64 extending along the circumference of the collar seal, which is also segmented at the corresponding splitlines 58. The retainer 36 also includes a flat land 66 spaced laterally from the bead 64 which collectively have a generally P-shaped configuration.

The two leaf plies 48 and encasing sheath 50 are welded at their proximal ends to the land 66. The proximal ends of the leaf plies and sheath include a generally 90 degree bend which permits the remainder of the leaf plies and sheath to extend over or overlap the bead 64 in a cantilevered manner. The bead 64 thusly defines a fulcrum for the leaf plies and sheath which extend thereover.

The leaf plies 48 and surrounding sheath 50 have common tip or distal end spaced suitably away from the bead 64, and are sufficiently flexible for accommodating deflection about the bead during operation.

As indicated above, the pressure forces P exerted by the pressurized air 16 during operation drives the tip ends of the leaf plies and surrounding sheath into sealing contact with the vane around the perimeter thereof. The vane is nevertheless subject to differential movement with the outer and inner bands under the temperature and pressure loading which occurs during operation of the turbine nozzle. The vane may rock or roll in space relative to the outer and inner bands, and the corresponding collar seals include sufficient flexibility for accommodating this relative movement of the vanes while still maintaining effective support and seals therefor.

In FIG. 4, the pressure force P of the pressurized air 16 tends to rotate the leaf plies and sheath clockwise, whereas differential movement between and bands may tend to rotate the leaf plies and sheath counterclockwise in opposition thereto. In this occurrence, the leaf plies and sheath may then bend about the fulcrum bead 64 when driven therearound during operation. The fulcrum bead 64 minimizes stresses in the leaf plies and sheath and maintains the integrity of the weld joint or bead 52 for ensuring a long useful life of the collar seal.

Figure 6:
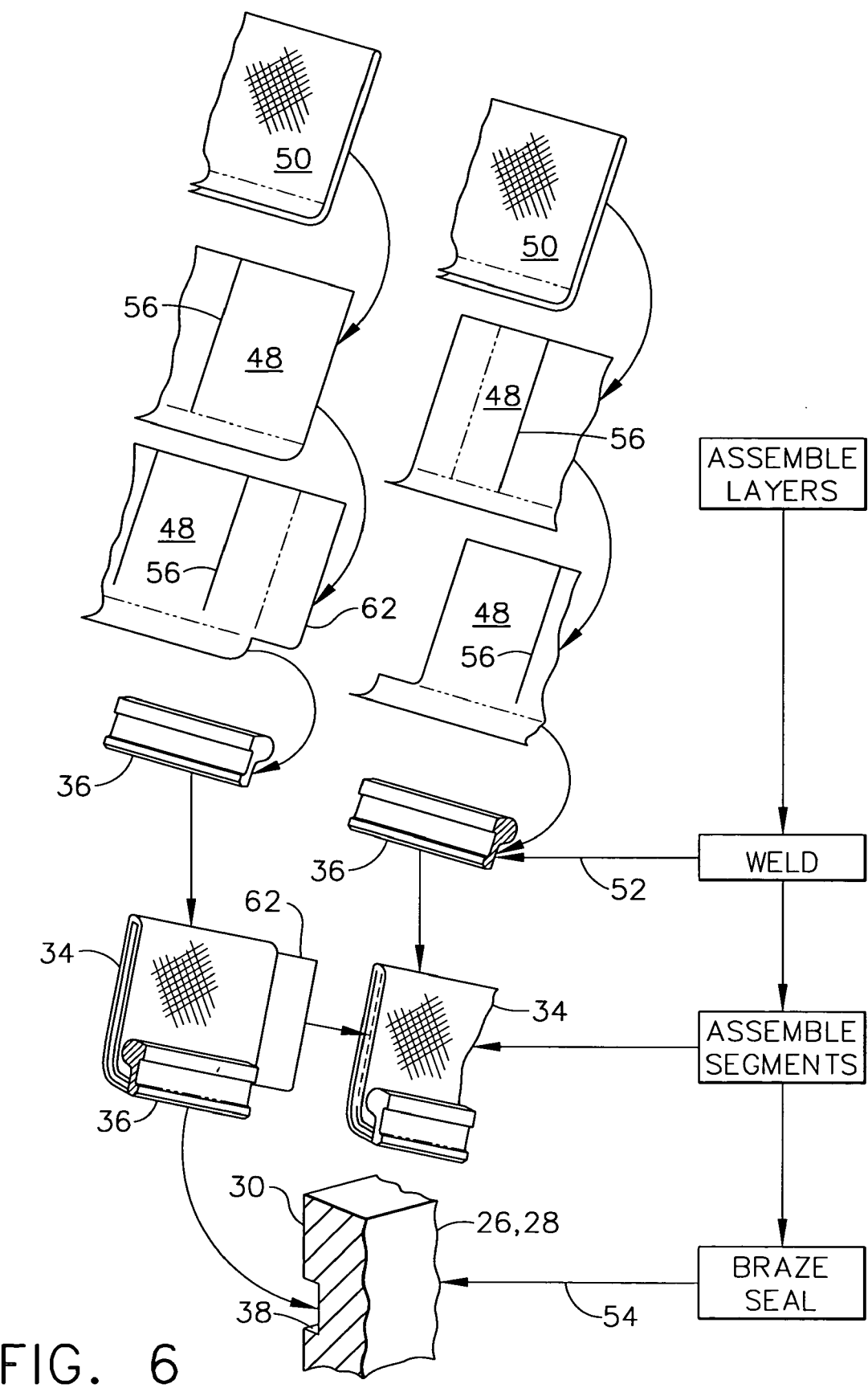
FIG. 6 is a flowchart representation of the assembly of the various components of the collar seal illustrated in FIGS. 3–5, and their mounting into the corresponding metal band in an exemplary embodiment.

FIG. 6 illustrates schematically the assembly of the various segments of the collar seal in a preferred embodiment. The two leaf plies 48 of each segment may be assembled together and encased in the woven sheath 50 therearound. The proximal ends of the leaf plies and sheath are then placed in abutment with the retainer segments 36 and suitably welded thereto.

The so-preassembled collar segments may then be joined together in abutment, with the tabs 62 of one segment being inserted into the corresponding groove in the adjacent segment, and assembled together in the mounting slots 38 of the bands 26,28. The retainer segments 36 are then suitably brazed in their mounting slots 38 as indicated above. Final assembly includes trapping the individual vanes between the two halves of each collar seal and joining together the various band segments to form the complete 360 degree nozzle assembly.

The collar seal disclosed above permits mounting of the ceramic vanes 32 illustrated in FIGS. 1–3 into supporting metal band segments in both the outer and inner bands 26,28. The vanes 32 remain discrete or individual components trapped by the corresponding collar seals 34 in the respective mounting apertures 30 of the two bands in stark contrast with the unitary configuration of typical metal vanes in metal bands found in conventional turbine nozzles.

The collar seals 34 completely encircle the supported ends of the ceramic vanes and provide effective seals therearound to contain the combustion gases in the nozzle passages between the vanes, while minimizing any leakage of the pressurized air past the collar seals.

The collar seals provide resilient supports for the ceramic vanes and accommodate the various differential movement between the vanes and bands due to the pressure loads of the combustion gases and the differential expansion and contraction between the vanes and bands due to the operating temperature of the combustion gases through the various portions of the typical engine cycle.

Segmenting of the collar seal permits the local tailoring of the individual segments to the different local contours of the vane being supported, and permits the use of initially flat, thin, sheet metal leaf plies and woven fabric sheath 50 which conform with the airfoil contour of the vanes when fixedly joined to the airfoil contour of the supporting retainers 36.

The segmented construction of the individual collar seals 34 additionally permits matching of the cylindrical contour of the annular outer and inner bands in which the mounting apertures 30 are found and sealed with the complementary collar seals 34.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A collar seal for a turbine vane comprising:
   a rigid annular retainer having a circumferential airfoil contour conforming with the airfoil contour of said vane;
   flexible sheet metal leaf plies laminated around said airfoil contour of said retainer, and fixedly joined thereto; and
   a woven sheath encasing said leaf plies and fixedly joined to said retainer.

2. A seal according to claim 1 wherein said retainer includes an arcuate bead extending along said circumference thereof spaced laterally from a land, and said leaf plies and sheath are welded to said land and bend to overlap said bead.

3. A seal according to claim 2 wherein said sheath wraps around said leaf plies and conforms therewith around said airfoil contour of said retainer, and is commonly joined with proximal ends of said leaf plies to said retainer.

4. A seal according to claim 3 wherein said leaf plies include slits for increasing flexibility thereof, and said slits are offset between said leaf plies.

5. A seal according to claim 4 wherein said retainer, leaf plies, and sheath are segmented around the circumference thereof, and said segmented leaf plies overlap each other around said circumference.

6. A seal according to claim 5 wherein:
   said segmented retainer includes portions abutting each other around said circumference;
   said segmented sheath includes portions abutting each other around said circumference; and
   said segmented leaf plies include portions abutting each other around said circumference.

7. A turbine nozzle comprising:
   radially outer and inner bands having a plurality of circumferentially spaced apart apertures extending radially therethrough;
   a plurality of ceramic nozzle vanes, each having opposite ends extending through said apertures in said bands;
   a plurality of collar seals fixedly joined at one end to said bands in respective ones of said apertures, and having opposite tip ends surrounding said vane ends in sealing engagement therewith; and
   each of said collar seals includes:
   a rigid annular retainer having a circumferential airfoil contour conforming with the airfoil contour of said vane;
   flexible sheet metal leaf plies laminated around said airfoil contour of said retainer, and fixedly joined thereto; and
   a woven sheath encasing said leaf plies and fixedly joined to said retainer.

8. A nozzle according to claim 7 wherein said retainer includes an arcuate bead extending along said circumference thereof spaced laterally from a land, and said leaf plies and sheath are welded to said land and bend to overlap said bead.

9. A nozzle according to claim 8 wherein said leaf plies include slits for increasing flexibility thereof, and said slits are offset between said leaf plies.

10. A nozzle according to claim 9 wherein said retainer, leaf plies, and sheath are segmented around the circumference thereof, and said segmented leaf plies overlap each other around said circumference.

11. A collar seal for a turbine vane comprising:
    an annular retainer having a circumferential airfoil contour conforming with the airfoil contour of said vane;
    a flexible leaf surrounded by said retainer and fixedly joined thereto; and
    a woven sheath encasing said leaf and fixedly joined to said retainer.

12. A seal according to claim 11 wherein said leaf is laminated around said airfoil contour of said retainer, and is cantilevered outwardly therefrom.

13. A seal according to claim 12 wherein said leaf comprises two plies fixedly joined together at said retainer, and abutting each other outwardly therefrom.

14. A seal according to claim 13 wherein said sheath wraps around said two-ply leaf and conforms therewith around said airfoil contour of said retainer, and is commonly joined with proximal ends of said leaf plies to said retainer.

15. A seal according to claim 14 wherein said leaf plies include slits for increasing flexibility thereof.

16. A seal according to claim 15 wherein said leaf slits are offset between said two plies.

17. A seal according to claim 14 wherein said retainer, leaf plies, and sheath are segmented around the circumference thereof.

18. A seal according to claim 17 wherein said segmented leaf plies overlap each other around said circumference thereof.

19. A seal according to claim 18 wherein:
    said segmented retainer includes portions abutting each other around said circumference;
    said segmented sheath includes portions abutting each other around said circumference; and
    said segmented leaf plies include portions abutting each other around said circumference.

20. A seal according to claim 14 wherein:
    said retainer comprises a rigid bar having said airfoil contour; and
    said leaf plies comprise flexible sheet metal fixedly joined to said rigid bar to conform with said airfoil contour.

21. A seal according to claim 20 wherein said retainer includes an arcuate bead extending along said circumference thereof spaced laterally from a land, and said leaf plies and sheath are welded to said land and bend to overlap said bead.

22. A seal according to claim 21 wherein said leaf plies and surrounding sheath have common distal ends spaced from said bead and being flexibly deflectable thereabout.

23. A turbine nozzle comprising:
radially outer and inner bands having a plurality of circumferentially spaced apart apertures extending radially therethrough;
a plurality of ceramic nozzle vanes, each having opposite ends extending through said apertures in said bands;
a plurality of collar seals fixedly joined at one end to said bands in respective ones of said apertures, and having opposite tip ends surrounding said vane ends in sealing engagement therewith.

24. A nozzle according to claim 23 wherein each of said collar seals comprises:
an annular retainer fixedly joined to said bands, and having a circumferential airfoil contour conforming with the airfoil contour of said vanes;
a flexible leaf surrounded by said retainer and fixedly joined thereto; and
a woven sheath encasing said leaf and fixedly joined to said retainer, and including said tip end abutting said vane to provide a seal therearound.

25. A nozzle according to claim 24 wherein said leaf is laminated around said airfoil contour of said retainer, and is cantilevered outwardly therefrom.

26. A nozzle according to claim 25 wherein said leaf comprises two plies fixedly joined together at said retainer, and abutting each other outwardly therefrom.

27. A nozzle according to claim 26 wherein said sheath wraps around said two-ply leaf and conforms therewith around said airfoil contour of said retainer, and is commonly joined with proximal ends of said leaf plies to said retainer.

28. A nozzle according to claim 27 wherein said leaf plies include slits for increasing flexibility thereof.

29. A nozzle according to claim 28 wherein said retainer, leaf plies, and sheath are segmented around the circumference thereof.

30. A nozzle according to claim 29 wherein:
said retainer comprises a rigid bar having said airfoil contour; and
said leaf plies comprise flexible sheet metal fixedly joined to said rigid bar to conform with said airfoil contour.

31. A nozzle according to claim 30 wherein said retainer includes an arcuate bead extending along said circumference thereof spaced laterally from a land, and said leaf plies and sheath are welded to said land and bend to overlap said bead.

* * * * *